US009429395B2

(12) United States Patent
Schade et al.

(10) Patent No.: US 9,429,395 B2
(45) Date of Patent: Aug. 30, 2016

(54) GRADIENT BALLISTIC MATERIAL AND HONEYCOMB GRILLE

(71) Applicant: BAE Systems Land & Armaments, L.P., Santa Clara, CA (US)

(72) Inventors: David Arthur Schade, Belmont, CA (US); Dennis Jenks, Gilroy, CA (US); Adrienne Bourque, San Jose, CA (US); David Carlin, San Jose, CA (US); Mark Albert Middione, Scotts Valley, CA (US); Adonis Kassinos, San Jose, CA (US); James Cole Barthel, Sterling Heights, MI (US); Chris Tarantino, Livermore, CA (US); Tom Winant, Los Altos, CA (US)

(73) Assignee: BAE Systems Land & Armaments, L.P., Santa Clara, CA (US)

( * ) Notice: Subject to any disclaimer, the term of this patent is extended or adjusted under 35 U.S.C. 154(b) by 157 days.

(21) Appl. No.: 14/202,991

(22) Filed: Mar. 10, 2014

(65) Prior Publication Data

US 2015/0323293 A1    Nov. 12, 2015

Related U.S. Application Data

(60) Provisional application No. 61/775,207, filed on Mar. 8, 2013, provisional application No. 61/775,219, filed on Mar. 8, 2013.

(51) Int. Cl.
| *F41H 5/02* | (2006.01) |
| *F41H 7/03* | (2006.01) |
| *F41H 7/04* | (2006.01) |
| *B60R 19/52* | (2006.01) |

(52) U.S. Cl.
CPC .............. *F41H 7/035* (2013.01); *B60R 19/52* (2013.01); *F41H 7/044* (2013.01); *B60R 2019/525* (2013.01)

(58) Field of Classification Search
CPC ............................ F24F 13/08; F24F 13/082
USPC ........................................................ 89/36.02
See application file for complete search history.

(56) References Cited

U.S. PATENT DOCUMENTS

| 3,901,124 A | 8/1975 | Hausenblas |
| 4,325,283 A | 4/1982 | Bemiss |
| 5,753,847 A | 5/1998 | Middione et al. |
| 5,780,761 A | 7/1998 | Musante et al. |
| 2012/0240757 A1* | 9/2012 | Schade .................. F41H 5/026 89/36.02 |

OTHER PUBLICATIONS

International Search Report and Written Opinion from related PCT Application PCT/US2014/022714, dated Oct. 28, 2014, 10 pgs.
International Preliminary Report on Patentability from PCT Application PCT/US2014/022714, dated Sep. 17, 2015, 10 pgs.

* cited by examiner

*Primary Examiner* — Samir Abdosh
(74) *Attorney, Agent, or Firm* — Patterson Thuente Pedersen, P.A.

(57) ABSTRACT

The invention is a gradient ballistic material and honeycomb grille that includes a louver system and a honeycomb structure. The louver system contains a gradient of ballistic materials to improve air handling and protection. The louver system may be constructed of one or more pieces of ballistic material so that at least one section is harder than a second section. The honeycomb structure acts a "catcher" or backstop to collect the fragments created by a projectiles contact with the harder section of the louver system.

14 Claims, 7 Drawing Sheets

GRADIENT BALLISTIC MATERIAL AND HONEYCOMB GRILLE

RELATED APPLICATIONS

The present application claims the benefit of U.S. Provisional Application No. 61/775,207 entitled "HONEYCOMB OR GRID PATTERN GRILLE ARMOUR", filed Mar. 8, 2013, and U.S. Provisional Application No. 61/775,219 entitled "AERODYNAMICALLY SHAPED GRADIENT BALLISTIC MATERIAL GRILLE", filed Mar. 8, 2013, which are incorporated herein by reference in their entirety.

FIELD OF THE INVENTION

The present invention is generally directed to the design of an air intake or exhaust grille for an armored vehicle and more specifically to the design of a grille having elements made of multiple materials disposed above a honeycomb or grid pattern layer so as to defeat oncoming threats.

BACKGROUND OF THE INVENTION

Combat vehicles need armor for ballistic protection. One weakness to any armor system is the air passages needed for running engines. For example, armored vehicles often have intake and exhaust vents for supplying air to engine components and other systems. However, if a projectile enters the vent, the projectile can damage the engine or other components or destroy the vehicle. In this application projectiles are considered missiles, artillery rounds, bullets, shrapnel, spall or other debris created by an explosive event. To combat the threat, a grille having a plurality of louvers is commonly fitted to the intake and exhaust vents to prevent projectiles from entering the engine compartment while permitting air to flow between the louvers into the protected area.

A balance must be reached between protection and functionality. While a need exists to supply air for operation and cooling, there is also a need to protect the occupants of the vehicle as well as allow the vehicle to perform a given mission. Ballistic grilles are thus used to provide protection as well as airflow. The required openings for air flow make grilles inherently difficult to protect. As a result, grilles are traditionally not as well protected as the rest of vehicles armor.

There have been many types of approaches to protecting the intake and exhaust openings. Grilles with bars or louvers may slow or catch a threat, but because they are open, they may not fully stop a penetrator, or small fragments may break off and pass through the openings to impact crew or components behind the grille. Improving airflow, while providing improved ballistic protection, is always difficult.

Over the past decade, armor engineers have discovered/developed several concepts which improve grille aerodynamics and ballistics. Methods of defeating ballistic threats have focused in the past on the shape of the grille or increasing the weight of the grille. A common approach to reducing armor weight is through ceramics. Conventional armors use this approach; body armor uses hard ceramic in front with tough high strength fibers behind. Vehicle armors use hardened steel outer layers or ceramic on a tough middle or structural layer like aluminum or a softer more ductile steel and then inboard a tough high strength fiber layer. In conventional armor these layers are flat plates.

Grille armor has consisted of louvers, typically in a chevron or S shape. Made of aluminum or steel, the louvers are spaced to provide a circuitous open path that air can flow through. Projectiles that fly in a straight line are stopped by contact with the louvers. However, thick louvers block airflow or create stagnation points which affect engine performance.

All known grilles use the same materials through their full height. Some use laminates of different material as bars, but they go through the full thickness of the grille. The earlier designs have not worked to maximize the airflow while maintaining protection. Air flow is affected by spacing between the bars, width of the bars, and dimensions along the width of the bars.

An optimized ballistic grille must use openings in these elements to allow air flow. The greater the opening size, the better the flow, but the greater the challenge to ballistic protection. As such, there is a need for maintaining the protective ability of the grille while improving the airflow through the circuitous path. Similarly, there is a need for improving the protective ability of the grille while reducing or maintaining the weight and profile of the grill. The objective is to create a new grille which improves ballistic protection, reduces pressure drop and maintains flow volume over the existing steel bent bar grille.

SUMMARY OF THE INVENTION

The present invention is a grille configuration for an armored vehicle which uses a gradient of different materials in the construction of the grille louvers and a honeycomb layer as a "catcher". The materials for the louvers are selected to have an optimum effectiveness for their part of the defeat process. The grille must have openings in them for air to pass through. The openings are sized and aerodynamically shaped to attain an optimum balance of airflow and ballistic protection.

The objective is to capture a grille concept which uses layers of material that are optimized from impact side to 'catcher' side to achieve high ballistic efficiency (good protection for a light weight). The geometry of these materials are selected and designed to provide a high volume and a small pressure drop through the grille.

In one aspect, this invention uses a gradient of multiple armor layers at different locations in the grille. The material properties and geometry of each layer is selected to provide optimum flow and ballistic properties based on its location in the armor defeat process. The resulting grille is thus lighter and more efficient at protecting the engine and or other internal components from threats.

In one embodiment, optimized grille armor would use a hard outer layer to erode projectiles. Behind the hard layer would be tougher/higher ductility (but softer) layers which have high capacity to absorb energy and catch projectiles. A third layer is the honeycomb structure. This gradient of multiple materials appears to be unique and offers significant performance over existing grilles that use homogenous materials through their thickness.

In one embodiment, optimized grille armor would use flat louvers or bars as the hard outer layer to erode projectiles. The flat louvers may be constructed of hardened steel or similar materials. Behind the hard layer would be tougher/higher ductility (but softer) S-louvers which have high capacity to absorb energy and catch projectiles. The S-louver may be constructed from aluminum, for example, or similar materials The honeycomb is placed under the grille to improve ballistic protection and airflow. The honeycomb's smaller opening size does a better job of catching small and large fragments and improves airflow. The airflow improvement also reduces engine fuel consumption and therefore saves logistics costs (fuel) over the life of a vehicle. This technical solution increases ballistic protection very significantly and improves airflow, which makes this idea very valuable for all armored combat or tactical vehicles.

In an embodiment, the honeycomb has an open top and bottom (no skins). Possible materials include Nomex® composite, aluminum, stainless steel, but any material could be used in a honeycomb or grid pattern. The cell size may be 1/16" to 1/4". The wall thickness may be from 0.001" to 0.008". The webs may be joined by bonding or welding depending on the manufacturer or the material. The height/thickness of the honeycomb may be 3/8" to 2". The honeycomb selection is dependent on flow & protection requirements as well as the grille components above.

The percent open flow area through the honeycomb may be over 90%. The honeycomb should have a greater open area than bars or louvers in the front of the grille; this should prevent the honeycomb from becoming the dominant flow restriction. The honeycomb material selection must be compatible with typical environmental and NBC requirement for combat vehicles.

In an embodiment, an optimized, best performing honeycomb configuration is: Stainless steel, 1/8" cell size, 0.003" wall, 1" high, ->97% open area. This is for an application under 5" high, 30 to 40 psf array of bars and louvers. Metal honeycomb has an added benefit in providing EMI shielding to a grille opening.

The present invention is a gradient ballistic material and honeycomb grille for stopping a projectile while still maintaining air flow. The grille comprising a grille unit which is surrounded by a mounting flange. The grille unit includes a plurality of flat louvers positioned parallel to each other, a plurality of S-louvers positioned parallel to each other; and a honeycomb unit positioned adjacent the S-louvers. The flat louvers have a mating face that abuts a mating face of the S-louver. The flat louver maybe constructed of a harder material than that of the S-louver. The pitch of the flat louvers is such that the projectile cannot pass through the grille in a straight line.

The present invention includes a method for stopping a projectile while still maintaining air flow to a vehicle utilizing a gradient ballistic material and honeycomb grille. The method comprising; positioning a plurality of flat louvers parallel to each other across the length of the grille, positioning a plurality of S-louvers parallel to each other across the length of the grille; and positioning a honeycomb unit adjacent the S-louvers. The flat louvers have a mating face that abuts a mating face of the S-louver and the flat louvers are constructed of a harder material than that of the S-louver. The pitch of the flat louvers is such that the projectile cannot pass through the grille in a straight line. The S-louver includes a hook end for catching fragments created by the projectile striking the flat louver or it may include a rounded end for catching fragments.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The present invention is an air passage protection system that includes a louver system and a honeycomb structure. The louver system contains a gradient of ballistic materials to improve air handling and protection. The louver system may be constructed of one or multiple pieces of ballistic material. The honeycomb structure acts a "catcher" or backstop to collect the fragments created by a projectiles contact with the louver system.

Figure 1:
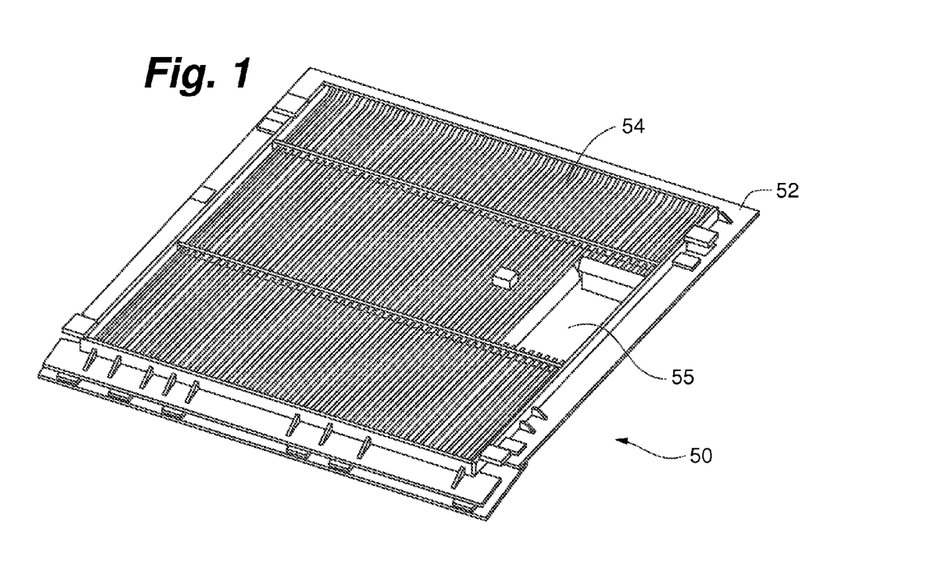
FIG. 1 is a top perspective view of a grille of the present invention
Figure 2:
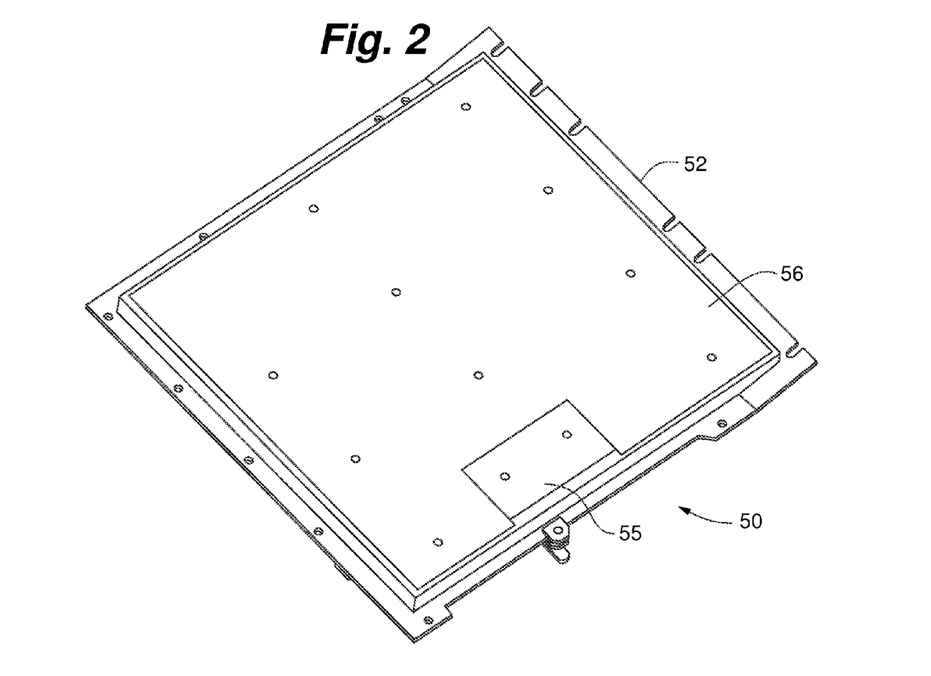
FIG. 2 is a bottom perspective view of a grille of the present invention.

As illustrated in FIGS. 1-2, is a grille structure 50 for an air intake or exhaust for an armored vehicle is presented. The present invention could be applicable to any structure requiring protection that has air handling needs, including vehicles or secured buildings with HVAC systems. The grille structure 50 includes a frame 52 which surrounds grille unit 54. The frame 52 allows for mounting of the grille structure 50 to a vehicle or other structure. In this embodiment, grille structure 50 also includes an access system 55 for removing the grille structure 50. A honeycomb 56 is attached so as to cover one planar face of the grille unit 54. The honeycomb 56 acts as a "catcher" to stop incoming threats that have been scattered or fragmented by the grille unit 54.

Figure 3:
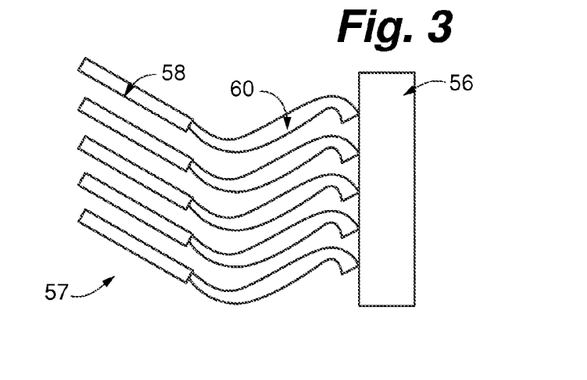
FIG. 3 is planar view of the grille elements of the present invention
Figure 4A:
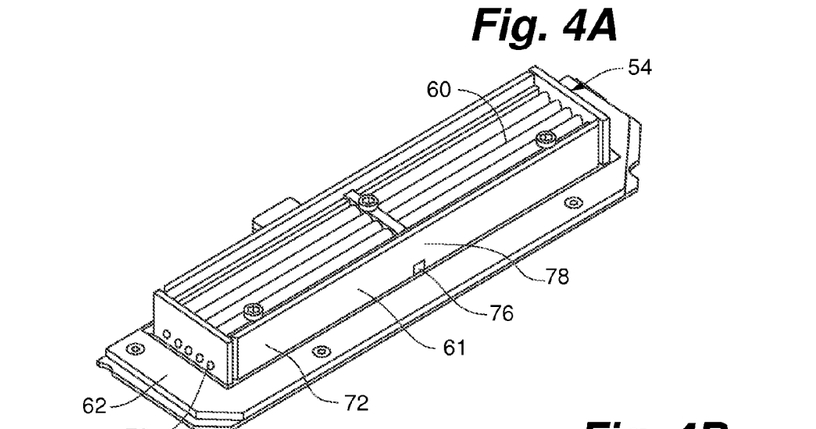
FIG. 4A is a top perspective view of an air cleaner grille which is used as the demonstrative for the present invention.
Figure 4B:
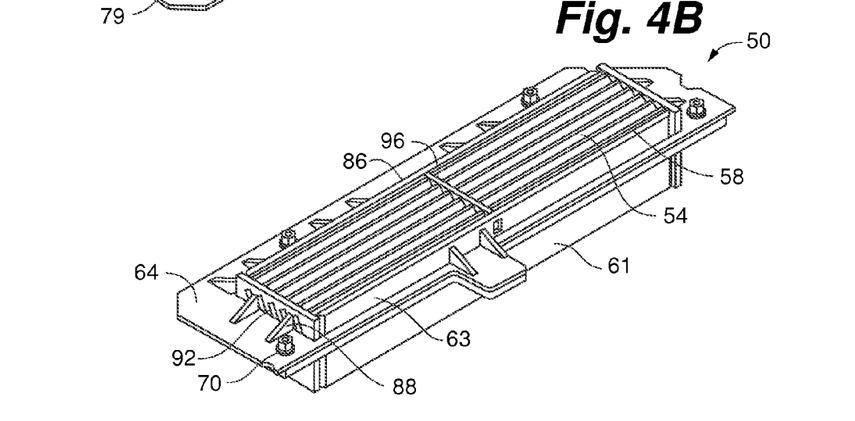
FIG. 4B is a bottom perspective view of an air cleaner grille which is used as the demonstrative for the present invention.
Figure 5A:
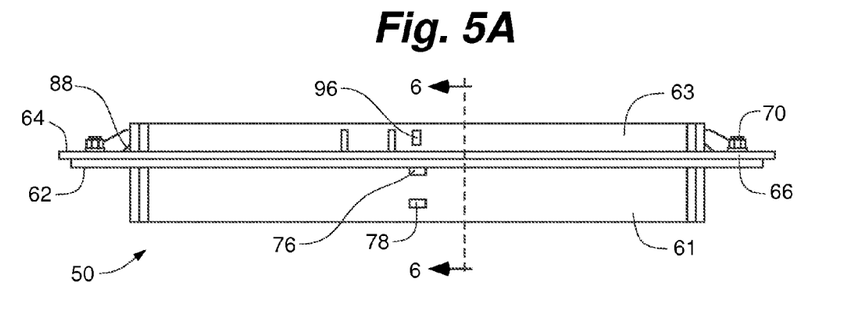
FIG. 5A is a side view of the grille embodiment depicted in FIG. 4A.
Figure 5B:
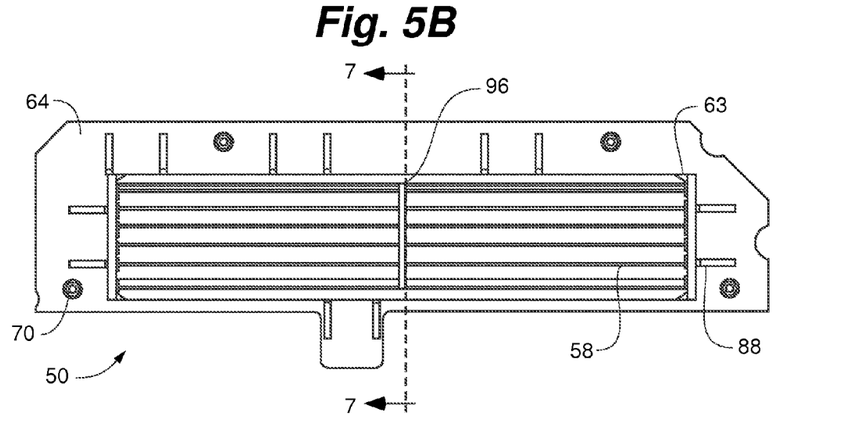
FIG. 5B is a top view of the grille embodiment depicted in FIG. 4A.
Figure 6:
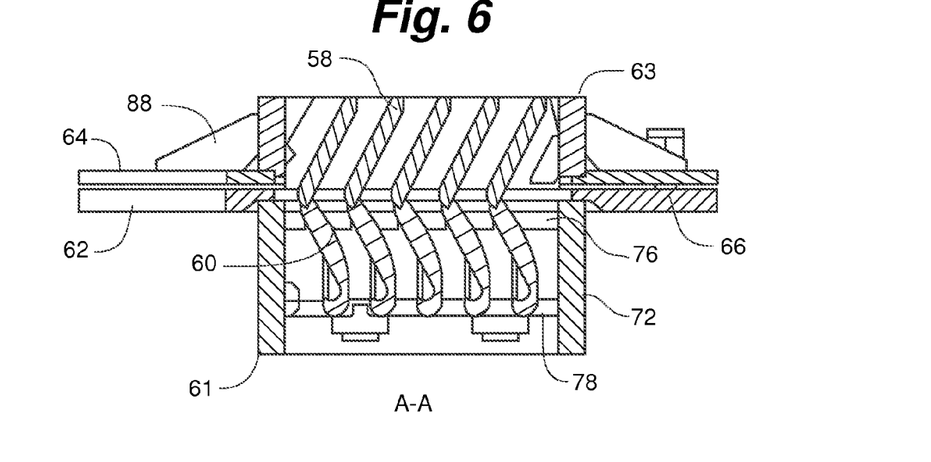
FIG. 6 is a planar view of FIG. 5A along axis A-A.
Figure 7:
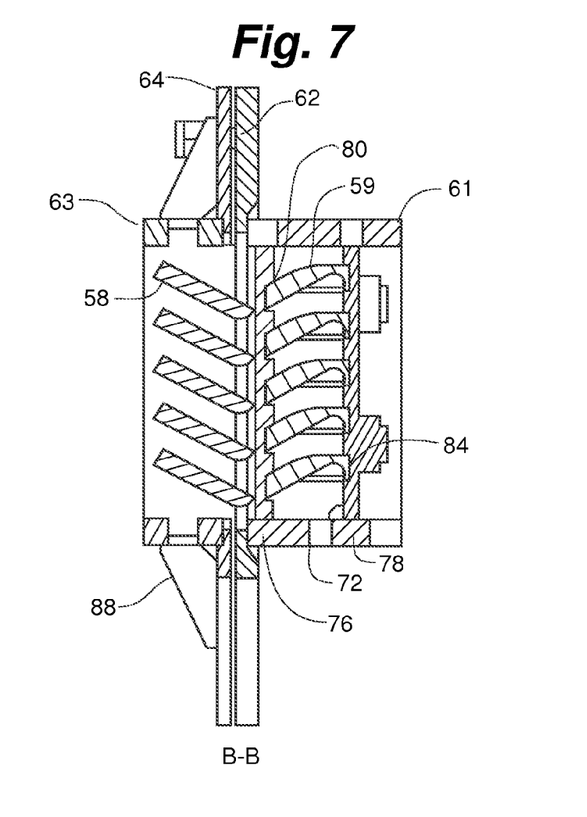
FIG. 7 is a planar view of FIG. 5B along axis B-B.

The basic layout of grille unit 54 is depicted in FIG. 3. In this embodiment, louver system 57 is comprised of at least two different materials disposed in respective layers. As illustrated in FIG. 3, grille unit 54 includes hard bars or flat louvers 58, ductile louvers or S-louvers 60 and a honeycomb 56. The hard bars 58 are placed on the attack side of the grille 54. Then, ductile formed louvers 60 are positioned to catch the main penetrator and finally honeycomb 56 acts as a final catcher for small fragments broken loose by the initial impact and driven through the openings between the bars 58 and louvers 60.

In one embodiment, the bar 58 material is High Hard Armor (HHA) Steel per MIL-DTL-46100 (yield strength 220 ksi). Inconel 625, Titanium and other materials may also be used as bars. Current applications prefer HHA because of its hardness, cost integratability and high density which allows a large flow area. Tungsten alloys, depleted Uranium and ceramics would also be option because of their hardness and high density.

Between the bars 58 and the honeycomb 56, the S-louvers 60 are disposed. The S-louvers 60 could be comprised of a softer material with tougher/higher ductility properties so as to absorb energy from the particles created after striking the outer layer. In one embodiment, the design is an 'S' shaped louver. In comparative flow testing, the S louver has lower pressure drop than other shapes of curved louvers The 'S' louver shape may be constructed in 4", 3", and shorter aluminum extrusions. The S-louver may be made with Titanium, S2 Fiberglass and Kevlar®.

In an embodiment, ballistically efficient grille have 60-80% of their weight in the bars 58 and 20 to 40% of their weight in the 'S' louver 60. The low density louver materials tend to have the best ballistic efficiency for their weight. Kevlar® and aluminum having the best ballistics and titanium and steel, the worst. 5000 series Aluminum is selected for most applications. It is easy to integrate by welding, low cost and its comparatively higher density enables the grille to fit in a smaller envelope. This facilitates an overall shorter grille which fits the tight space envelopes required by vehicles.

Alternatively, a pultruded Kevlar® louver may offer the highest ballistic efficiency and the hook can be filled with soft foam and covered. This smoothes flow but allows a fragment to pass through the foam fill and be caught in the hook. However, aluminum may be easy to integrate because it can be welded which may be more compatible with a metal vehicle and is a more mature material than pultruded Kevlar®.

The bars 58 and the S-louvers 60 typically have 50% to 75% open area to provide adequate flow volume. The leading and exit edges of both the bars 58 and the louvers 60 have chamfered or rounded edges to enable smoother airflow and minimize pressure drop.

Honeycomb 596 is the last and softest element behind the louver system 57. The foil walls and cells are sized to catch slow small fragments which emerge from the bar and louvers above. Aluminum and stainless steel honeycomb maybe used in grilles. Typically the aluminum walls are bonded while the stainless are spot welded to join the foil in segmented walls. For their weight they appear to have similar ballistic performance on a pound for pound basis. Aluminum honeycomb is less expensive than stainless, however, the welded stainless steel is more durable, and can withstand higher temperature than aluminum. Honeycomb selection will depend on the needs of each application. Other catcher materials include layers of wire mesh, Nomex® or other fiber reinforced plastic honeycombs and open cell foams made of metal or composite. Honeycomb is preferred because it has up to 98% open area and presents a very low flow restriction. The metallic honeycombs can be used as EMI shields. Honeycomb 56 can also be used as a Foreign Object Debris Screen (FOD) to prevent radiators from being blocked by vegetation other debris.

The grille structure 50, as depicted in FIGS. 4A-12, is configured for an air intake. Alternate configurations are envisioned for exhaust or other openings that require passage of air. The grille unit 54 is comprised of an S-louver assembly 61 attached to a flat louver assembly 63. The S-louver assembly 61 is surrounded by an S-louver flange 62. Similarly, flat louver assembly 63 is surrounded by a flat louver flange 64. Both S-louver flange 62 and flat louver flange 64 include apertures 66 so that S-louver flange 62 and flat louver flange 64 may be fastened together with fasteners 70.

Figure 8:
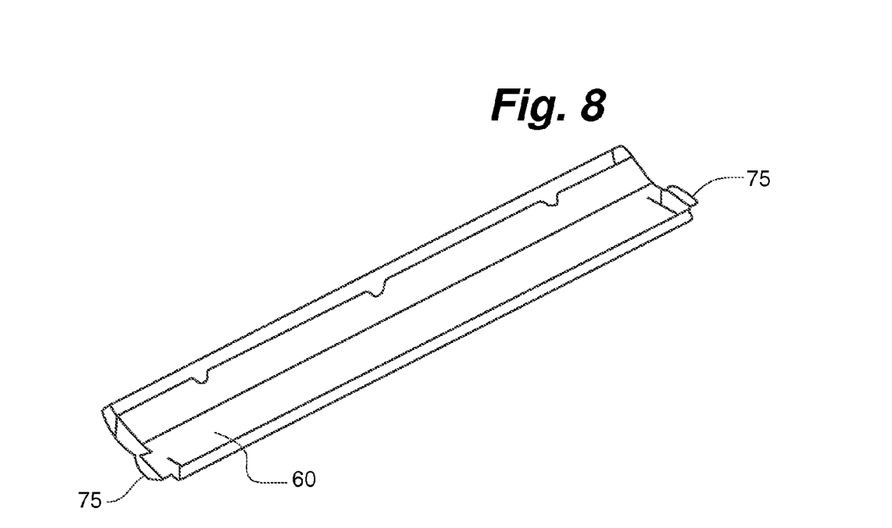
FIG. 8 is a perspective view of the S-louver assembly of the grille embodiment depicted in FIG. 4.

S-louver assembly 61 is generally comprised of S-louver flange 62 that surrounds S-louver compartment 72. Within S-louver compartment 72 are disposed a plurality of S-louvers 60. The S-louvers 60 are held within S-louver compartment 72 by S-louver top locator 76 and S-louver base locator 78. S-louver top locator 76 may include slots 80 so that S-louver 60 can abut flat louver 58. S-louver base locator 78 may include base slots 84 that maintain the relative position of the S-louver 60. At opposing ends of S-louver 60 are disposed S-louver flanges 75. S-louver flanges 75 are sized to fit within end slots 79 of S-louver compartment 72.

Figure 10:
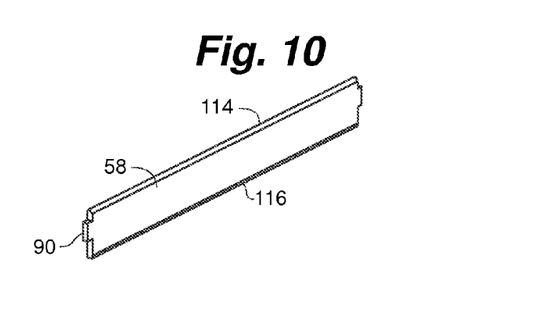
FIG. 10 is a perspective view of the flat louver of the grille embodiment depicted in FIG. 4.

Flat louver assembly 63 generally comprises of flat louver flange 64 that extends from flat louver compartment 86. A plurality of gussets 88 may connect flat louver flange 64 to flat louver compartment 86. Disposed within flat louver compartment 86 are a plurality of flat louvers 58. The flat louvers 58 include flat louver flanges 90 that extend from opposing ends of the flat louver 58. Flat louver compartment 86 includes angled slots 92 at opposing faces. The flat louver flanges 90 are sized to slidingly engage angled slots 92. Flat louver 58 can then be welded into place at the interface of flange 90 and slot 92. At least one flat louver locator bar 96 extends across the flat louver compartment 86 transverse to flat louvers 58.

Figure 9A:
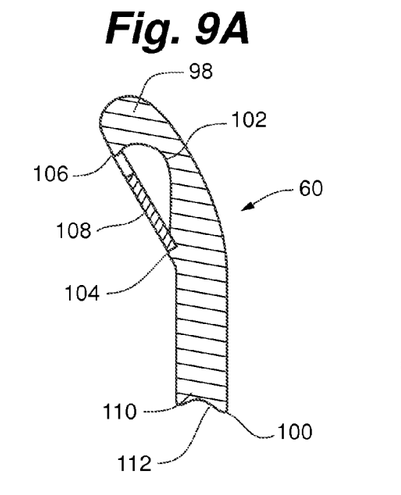
FIG. 9A is a cross-sectional view of the S-louver assembly of FIG. 8.

S-louver 60, as depicted in FIGS. 8 and 9A, has a hook end 98 at a first end and a mating end 100 at the second end. Hook end 98 defines an arcuate face 102 that is bounded by cover plate indent 104 and hook 106. Cover plate 108 extends across arcuate face 102 with a first end seated in cover plate indent 104 and opposing end abutting hook 106. Cover plate 108 is constructed of a soft material, such as a thin wall of aluminum or polymer, and is positioned to improve the aerodynamics of S-louver 60.

In an alternate embodiment, to improve air-flow, the hook 98 of the louver is closed in by a closed cell foam. This eliminates air re-circulation in the hook cavity region and reduces flow instabilities associated with vortex shedding leading to improved flow characteristics and a reduction in the pressure drop as has been observed in flow modeling. The cover plate 108 is not intended to stop fragments, as that is the purpose of the hook end 98. Mating end 100 includes mating indent 110. Mating indent 110 includes an angled face 112 that sets the angle of flat louver 58 relative to S-louver 60.

Figure 9B:
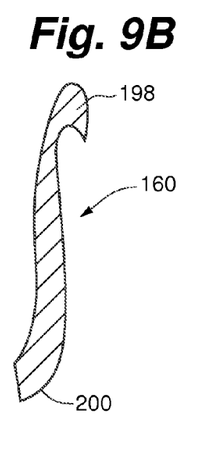
FIG. 9B is an alternate embodiment cross-sectional view of the S-louver assembly.

In an alternate embodiment, as depicted in FIG. 9B, S-louver 160 includes the same hook arrangement 198 but the base structure 200 lacks a mating indent.

Figure 9C:
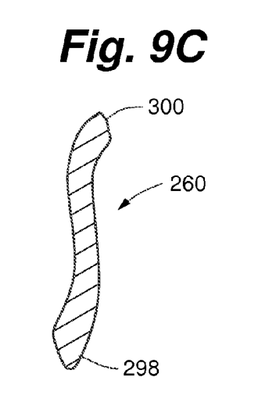
FIG. 9C is an alternate embodiment cross-sectional view of the S-louver assembly.

In an alternate embodiment, as depicted in FIG. 9C, S-louver 260 includes a closed hook 198 and the base structure 300 lacks a mating indent. Filling the hook in the extrusion reduces manufacturing cost. By not having to add a separate feature in the hook the air flow is smoother. Filling the hook portion may be performed by bonding a solid aluminum half round into the hook. A new aluminum extrusion with a closed hook can be slightly thinner at the same linear density. The thinner extrusion will result in a greater open area, resulting in lower flow velocity for a constant mass flow and a lower pressure drop.

Figure 11:
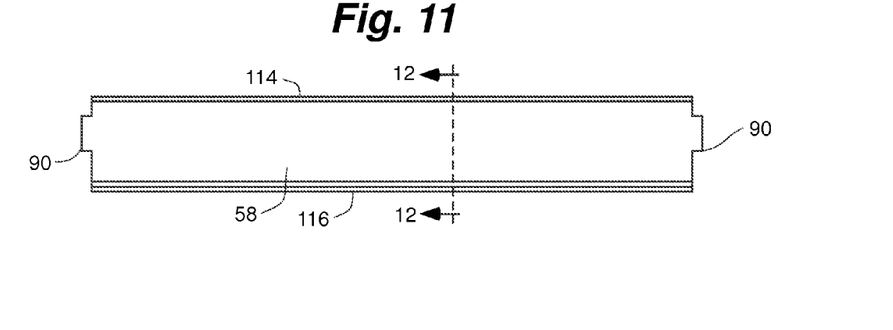
FIG. 11 is a top view of the flat louver of FIG. 10.
Figure 12:
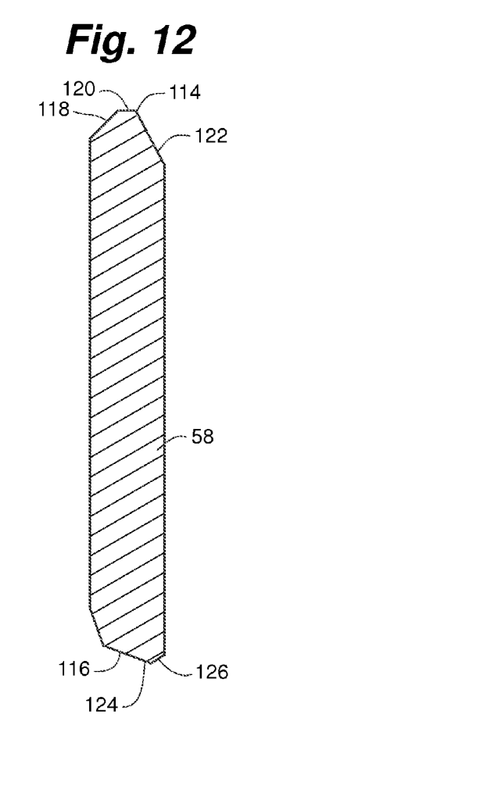
FIG. 12 is a cross sectional view of the flat louver of FIG. 11 at axis A-A.

Flat louver 58, as depicted in FIGS. 10-12, includes an outer edge 114 and an inner edge 116. Shortening the aluminum extrusion S-louvers and lengthening the flat louver bars improves flow and ballistic performance. Plus the overall profile is lower. Outer edge 114 includes chamfer face 118, flat end 120 and return face 122. Chamfer face 118 is angled so that flat louver 58 presents a face parallel to the top plane of flat louver compartment 86. Inner edge 116 includes an angled face 124 that rests on S-louver angled face 112 and abutment point 126 that mates with S-louver mating indent 110.

Figure 13:
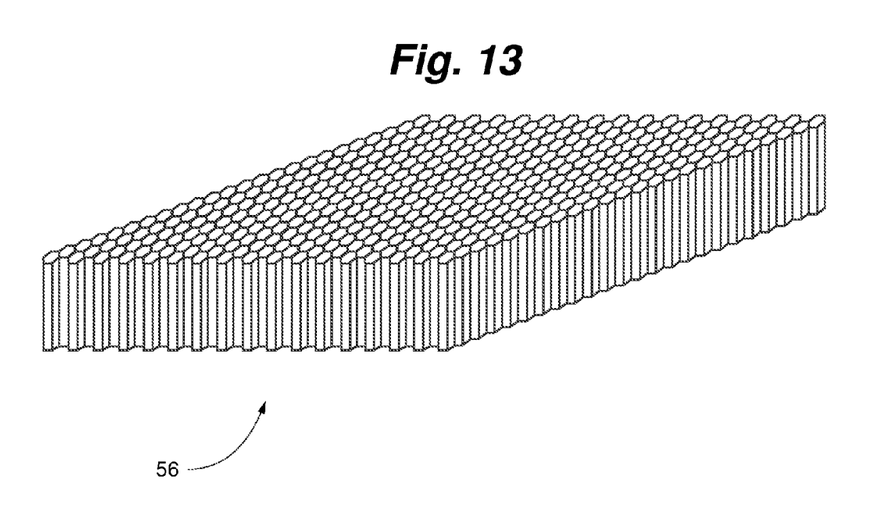
FIG. 13 is a perspective view of the honeycomb layer of the grille embodiment depicted in FIG. 4A.

The honeycomb 56 may use 0.002" to 0.004" foil, have a ⅛" cell width. The preferred material is 304 Stainless with the foil joined by spot welding. The honeycomb 56 may be 0.30" to 1.5" high. The honeycomb 56 may be cut at a slight angle to match the direction of the flow exiting the louvers. The honeycomb 56 is mounted to the S-louver compartment 72.

A grille 50 for light to medium artillery and small arms will be 2.5" to 4.5" high and 20 to 35 psf. A grille 50 for medium to heavy artillery will be 4" to 6" high and 30 to 45 psf. A grille 50 for heavy machine gun will be up to 8" thick or more and 80 psf. The ratio of material by thickness may be 10% to 20% honeycomb, 30% to 60% louvers and 30% to 60% bars.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. An air passage structure to stop a projectile while still maintaining air flow, the structure comprising;
   a grille unit which is surrounded by a mounting flange;
   said grille unit including a plurality of louvers positioned parallel to each other and having an air gap between each respective louver, the louvers are constructed of a flat louver section and an S-louver section wherein the S-louver section includes a hook end to trap projectile fragments at a first end and a mating indent at a second end for holding a flat louver mating face;
   each louver including at least a first metal section and a second metal section,
   wherein the first metal section and the second metal section overlap;
   the plurality of louvers further positioned so that the projectile cannot pass through the grill unit in a straight line; and
   a honeycomb structure that is mounted to an internal face of the grille unit.

2. The air passage structure of claim 1 wherein the flat louver section includes the first metal section.

3. The air passage structure of claim 1 wherein the S-louver section includes the second metal section.

4. The air passage structure of claim 1 wherein the first metal section is constructed of material harder than the second metal section, said first metal section selected from High Hard Armor (HHA) Steel, Inconel 625, Titanium, Tungsten alloys, and depleted Uranium.

5. The air passage structure of claim 1 wherein the second metal section is constructed of aluminum.

6. The air passage structure of claim 1 wherein the S-louver further includes a hook cap, the hook cap extending across the hook end to improve the aerodynamics of the louver.

7. The air passage structure of claim 1 wherein the S-louver includes a closed hook end.

8. The air passage structure of claim 1 wherein the S-louver section and the flat louver section are separate structures.

9. The air passage structure of claim 1 wherein the honeycomb is constructed of one of Nomex composite, aluminum, or stainless steel.

10. A gradient ballistic material and honeycomb grille for stopping a projectile while still maintaining air flow, the grille comprising;
    a grille unit which is surrounded by a mounting flange, said grille unit including;
       a plurality of flat louvers positioned parallel to each other,
       a plurality of S-louvers positioned parallel to each other; and
       a honeycomb unit positioned adjacent the S-louvers;
    wherein the flat louvers have a mating face that overlaps a mating face of the S-louver, and the pitch of the flat louvers is such that the projectile cannot pass through the grille in a straight line; and
    wherein the S-louver section includes a hook end to trap projectile fragments at a first end and a mating indent at a second end for holding the flat louver mating face.

11. The gradient ballistic material and honeycomb grille claim 10 wherein the S-louver further includes a hook cap, the hook cap extending across the hook end to improve the aerodynamics of the louver.

12. The gradient ballistic material and honeycomb grille of claim 10 wherein the S-louver includes a closed hook end.

13. A method for stopping a projectile while still maintaining air flow to a vehicle utilizing a gradient ballistic material and a honeycomb grille, the method comprising;
    positioning a plurality of flat louvers parallel to each other across the length of the grille,
    positioning a plurality of S-louvers parallel to each other across the length of the grille; and
    positioning a honeycomb unit adjacent the S-louvers;
    wherein the flat louvers have a mating face that overlaps a mating face of the S-louver;
    wherein the S-louver section includes a hook end to trap projectile fragments at a first end and a mating indent at a second end for holding the flat louver mating face:
    and the pitch of the flat louvers is such that the projectile cannot pass through the grille in a straight line.

14. The method of claim 13 wherein the S-louver includes a rounded end for catching fragments created by the projectile striking the flat louver.

* * * * *